United States Patent
Carbune et al.

(10) Patent No.: US 12,164,584 B2
(45) Date of Patent: Dec. 10, 2024

(54) SYSTEM AND METHOD FOR IDENTIFYING PLACES USING CONTEXTUAL INFORMATION

(71) Applicant: Google LLC, Mountain View, CA (US)

(72) Inventors: Victor Carbune, Zurich (CH); Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/013,954

(22) Filed: Sep. 8, 2020

(65) Prior Publication Data

US 2022/0075836 A1 Mar. 10, 2022

(51) Int. Cl.
*G06F 16/00* (2019.01)
*G06F 16/2457* (2019.01)
*G06F 16/29* (2019.01)
*G06F 16/9535* (2019.01)
*G06F 16/9537* (2019.01)
*G06F 16/9538* (2019.01)

(52) U.S. Cl.
CPC .... *G06F 16/9537* (2019.01); *G06F 16/24578* (2019.01); *G06F 16/29* (2019.01); *G06F 16/9535* (2019.01); *G06F 16/9538* (2019.01)

(58) Field of Classification Search
CPC ............. G06F 16/9537; G06F 16/9538; G06F 16/24578; G06F 16/29; G06F 16/9535
USPC ................................................. 707/600–899
See application file for complete search history.

(56) References Cited

U.S. PATENT DOCUMENTS

| | | |
|---|---|---|
| 8,473,517 B2 | 6/2013 | Sly et al. |
| 8,775,400 B2 | 7/2014 | Ickman et al. |
| 9,204,254 B2 | 12/2015 | Hawkins et al. |
| 9,769,634 B2 | 9/2017 | Marti et al. |
| 9,787,557 B2 | 10/2017 | Leblanc et al. |
| 10,628,504 B2 | 4/2020 | Mital et al. |
| 2005/0091269 A1* | 4/2005 | Gerber ............... G06F 9/44505 |
| 2008/0194268 A1 | 8/2008 | Koch |
| 2011/0145719 A1* | 6/2011 | Chen ...................... G06Q 10/10 |
| | | 715/739 |
| 2011/0258049 A1* | 10/2011 | Ramer ............... G06Q 30/0273 |
| | | 705/14.69 |
| 2012/0136865 A1 | 5/2012 | Blom et al. |
| 2012/0251011 A1 | 10/2012 | Gao et al. |
| 2014/0081633 A1 | 3/2014 | Badaskar |
| 2014/0274022 A1 | 9/2014 | Bell et al. |
| 2015/0302013 A1 | 10/2015 | Sung et al. |
| 2016/0157062 A1 | 6/2016 | Shim et al. |
| 2016/0189186 A1 | 6/2016 | Fabrikant et al. |
| 2016/0366545 A1* | 12/2016 | Yamasaki ........... G06F 3/04842 |

(Continued)

*Primary Examiner* — Irete F Ehichioya
*Assistant Examiner* — Shirley D Hicks
(74) *Attorney, Agent, or Firm* — Lerner David LLP

(57) ABSTRACT

The present disclosure provides a computing device and method for providing personal specific information based on semantic queries. The semantic queries may be input in a natural language form, and may include user specific context, such as by referring to prior or future events related to a place the user is searching for. With the user's authorization, data associated with prior or planned activities of the user may be accessed and information from the accessed data may be identified, wherein the information is correlated with the user specific context. One or more query results are determined based on the identified information and provided for output to the user.

20 Claims, 11 Drawing Sheets

(56) References Cited

U.S. PATENT DOCUMENTS

| | | |
|---|---|---|
| 2017/0116285 A1 | 4/2017 | Dotan-Cohen et al. |
| 2020/0004890 A1* | 1/2020 | Myhre .................... G06F 40/30 |
| 2020/0267435 A1* | 8/2020 | Gordon ............. H04N 21/8586 |
| 2020/0410428 A1* | 12/2020 | Yan .......................... G06N 7/01 |

* cited by examiner

Navigate to the restaurant we go to with Victor for work dinners

SYSTEM AND METHOD FOR IDENTIFYING PLACES USING CONTEXTUAL INFORMATION

BACKGROUND

Digital maps are widely used to provide information related to geographical regions of interest, including information about roads, traffic, buildings, landmarks, retail or grocery stores, and the like. Interactive maps often allow a user, for example, to access the digital map of a selected region to search for places, such as restaurants, local businesses, shops, theaters, etc. Where users do not have an exact address for the place they would like to search, they can search by name. However, sometimes a user may not be able to remember the name of a place, in addition to not knowing the address, which can create an obstacle for searching and require the user to try numerous other searches and look through many results.

BRIEF SUMMARY

The present disclosure provides a system and method for searching for particular locations using contextual information that may be specific to a user. For example, rather than simply searching based on a geographic location where the user is located or requiring the search query to include the specific name of a place, the user may enter a search query, such as "the restaurant we went to for our anniversary" or "navigate to grandma's house and stop at my favorite pizza place on the way." In one example, the method includes receiving, by one or more processors, a semantic query in a computing device. The semantic query refers to user specific context. With authorization from the user, data associated with prior or planned activities of the user is accessed by the one or more processors. The information correlated with the user specific context is identified in the accessed data by the one or more processors. One or more query results is determined based on the identified information by the one or more processors. The one or more query results in response to the semantic query is provided by the one or more processors.

In one aspect, a recommendation score indicative of correlation of the query results to the user specific context is generated by the one or more processors. The one or more query results is provided based on the recommendation score. In some implementations, the recommendation score is provided along with the query results. At least one of sent or received text messages, incoming/outgoing phone calls, emails, photos, videos, calendar events, social media, contact information, names of associated friends, local traffic patterns, places or visited restaurants, or recorded or marked locations is identified in a digital map.

In some implementations, the one or more query results are outputted in a digital map utilized in the computing device. The one or more query results are associated with event locations displayed in the digital map. In one aspect, the one or more query results with an associated event photo is outputted. In one aspect, the semantic query is received in a natural language form. An input for selection of one of the query results is received. The selected query result is saved in the computing device by the one or more processors. In one aspect, one or more query results comprising processing the identified information using neural networks is determined. At least one of place embeddings or correlated data and query embedding is processed by running a neural network.

In some implementations, a user pattern based on the accessed data is detected by the one or more processors. The user pattern is saved in the computing device by the one or more processors. In one aspect, visited places with semantic identifiers is correlated from the user specific context. In one aspect, event information is correlated with the visited places and the semantic identifiers from the user specific context. In one aspect, timestamps are correlated with the event and visited places and the semantic identifiers from the user specific context. An input for selection of one of the query results is received by the one or more processors. Navigation in the computing device for travel to a destination based on the selected query result is provided.

Another aspect of the disclosure provides a computing device. The computing device includes one or more memories, and one or more processors in communication with the one or more memories. The one or more processors is configured to receive a semantic query in a computing device. The semantic query refers to user specific context. The one or more processors is configured to access data associated with prior or planned activities of the user with authorization from the user in the computing device. The one or more processors is configured to identify information in the accessed data correlated with the user specific context. The one or more processors is configured to determine one or more query results based on the identified information and provide the one or more query results in response to the semantic query.

In one aspect, the one or more processors are further configured to generate a recommendation score indicative of correlation of the query results related to the information, wherein the one or more query results is based on the recommendation score. In one aspect, the one or more processors are further configured to receive an input in the computing device to select one of the query results and generate navigation information in the computing device.

Another aspect of the disclosure provides a computer-readable storage medium storing instructions executable by one or more processors for performing a method. The method includes receiving, by one or more processors, a semantic query in a computing device, wherein the semantic query refers to user specific context. With authorization from the user, data associated with prior or planned activities is accessed. information in the accessed data correlated with the user specific context is identified by the one or more processors. One or more query results based on the identified information is determined by the one or more processors. The one or more query results in response to the semantic query is provided by the one or more processors.

In one aspect, the method further includes generating a recommendation score indicative of correlation of the query results related to the information, wherein providing the one or more query results is based on the recommendation score.

DETAILED DESCRIPTION

The present disclosure provides for automatically inferring semantic names and attributes for places and allowing for users to search using semantic queries. The semantic queries may be interpreted by a computing device in a natural language form. The semantic queries may refer to user specific context. By way of example, the search query may refer to places a user previously visited, made plans to visit, etc. The computing device may identify results to the semantic query using information associated with prior activities of the user or other information specific to the user. Access or gathering of the data associated with the users will require authorization from the user.

Figure 1:
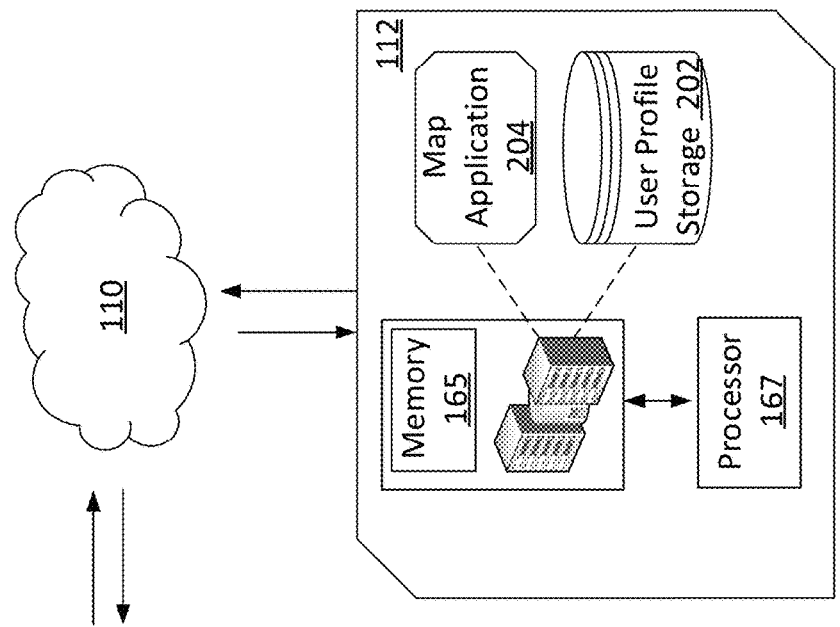
FIG. 1 is a block diagram of an example computing device according to aspects of the disclosure.
Figure 1:
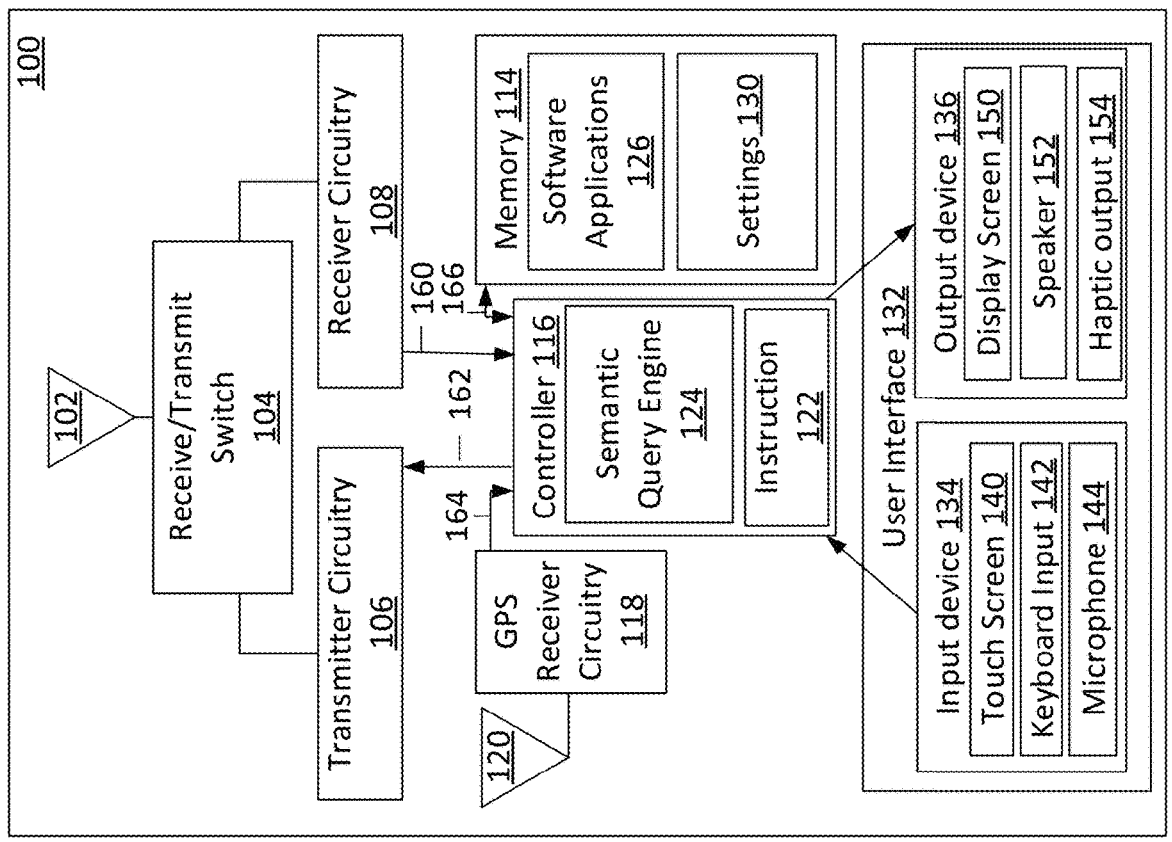

FIG. 1 depicts a detailed block diagram of an example computing device 100. The computing device 100 may be any device that can perform a computational operation or computational analysis. Suitable examples of the computing device 100 include desktop computers, laptop computers, PDA, personal computer, tablets, portable devices, such as smart phones, mobile phones, wearable devices and the like. In one example, the computing device 100 utilized herein is a smart phone. However, the computing device 100 described herein is not limited in this regard.

In one example, the computing device 100 has multiple components embedded therein. Each component may be in direct or indirect communication to each other. In the example depicted in FIG. 1, the computing device 100 includes one or more controllers 116 configured to be in electrical communication with a user interface 132, a memory 114, a GPS receiver circuitry 118, a transmitter circuitry 106 and a receiver circuitry 108. The one or more controller 116 can be any suitable processors, such as a microprocessor. Alternatively, the controller 116 can be dedicated components such as an application specific integrated circuit ("ASIC") or other hardware-based processor. Although not necessary, one or more of computing devices 100 may include specialized hardware components to perform specific computing processes, such as geographic coordination reading, data retrieval and access, street image recognition, GPS related searches and positioning, geographic location encoding, etc.

An antenna 102 may be disposed in the computing device 100 configured to receive and transmit Radio Frequency (RF) signals, WiFi signals, Bluetooth signals, GPS signals or any suitable electrical signals. A receive/transmit (Rx/Tx) switch 104 selectively couples the antenna 102 to the transmitter circuitry 106 and receiver circuitry 108. The receiver circuitry 108 demodulates and decodes the electrical signals received from a network 110 to derive information therefrom. The network 110 may be further communicated with a database server 112 so as to provide information requested or inquired by the computing device 100. The network 110 provides connectivity between the computing device 100 and the database server 112. The network 110 may utilize standard communications protocols, such as internet, Ethernet, WiFi, satellite communications, HTTP and protocols that are proprietary to one or more companies, and various combinations of the foregoing. For example, the network 110 may be wired or wireless local area network (LAN), wide area network (WAN), cellular communication network. The database server 112 may also be a computing device which also includes at least one processor, a receiver/transmitter, an interconnection interface and a memory that may store, send and/or generate information, data, software applications, map data, content, or interactive applications to the computing device 100. Thus, during operation, the database server 112 may execute operations including receiving requests from the computing device 100, such as a device that a user is interacting with, through the network 110. Subsequently, the database server 112 may then process, respond and provide the requested content, interaction, map data, or information through the network 110 to the computing device 100.

In one example, the receiver circuitry 108 is coupled to the controller 116 via an electrical connection 160. The receiver circuitry 108 provides the decoded electrical signals information to the controller 116. The controller 116 also provides information to the transmitter circuitry 106 for encoding and modulating information into electrical signals. Accordingly, the controller 116 is coupled to the transmitter circuitry 106 via an electrical connection 162. The transmitter circuitry 106 communicates the electrical signals to the antenna 102 for transmission to the database server 112 through the network 100.

In one example when the computing device 100 includes a GPS-enabled implementation, an antenna 120 is coupled to GPS receiver circuitry 118 for receiving GPS signals. The GPS receiver circuitry 118 demodulates and decodes the GPS signals to extract GPS location information therefrom. The GPS location information indicates the location of the computing device 100. The GPS receiver circuitry 118 provides the decoded GPS location information to the controller 116. As such, the GPS receiver circuitry 118 is coupled to the controller 116 via an electrical connection 164. It is noted that the present disclosure is not limited to GPS based methods for determining a location of the computing device 100. Other methods for determining a location of the computing device can be used herein. It is noted that when a GPS receiver circuitry is not utilized or present in the computing device 100, the receive/transmit (Rx/Tx) switch 104 along with the transmitter circuitry 106 and the receiver circuitry 108 may also function similar to the GPS receiver circuitry to provide the geographic information/location of the computing device 100.

In one example, the controller 116 stores the decoded electrical signal information and the decoded GPS location information in the memory 114 of the computing device 100. Accordingly, the memory 114 is connected to and accessible by the controller 116 through an electrical connection 166. The memory 114 of the computing device 100 may store information accessible by the one or more of the controllers 116 or processors, such as including instructions 122 that can be executed by the one or more controller 116. In one example, the memory 114 is a computer-readable storage medium comprising the instructions 122, which are executable computer instructions, for performing operations or commands input to the computing device 100. The memory 114 can also include applications 126 and settings 130, which are settings of operations and communications among different servers or modules and so on, that can be retrieved, manipulated, processed, executed, interacted or stored by the controller 116. In one example, the memory 114 may be a volatile memory and/or a non-volatile memory or any non-transitory type capable of storing information accessible by the controller/processor, such as a hard-drive, memory card, RAM, DVD, CD-ROM, a Dynamic Random Access Memory (DRAM), a Static Random Access Memory (SRAM), Read-Only Memory (ROM), flash memory, write-capable and read-only memories. The memory 114 can also have stored therein of software applications 126, for example, a map application that in communication with the map application, for implementing the methods of embodiments of the present disclosure that may be utilized in the computing device 100.

Various implementations may be utilized to provide geographic location information and semantic query configurations to be written into the memory 114. Examples of different modules that may be stored in the memory 114 are further described below with reference to FIG. 2. In one example, a user may directly provide information or a query by direct input to a user interface 132 on the computing device 100. Similarly, other methods of establishing the position or configurations of the computing device 100 may be employed. The computing device 100 may be or may not be GPS-enabled or even include communication features such as provided by antenna 102, 120 and receive/transmit switch 104, although the example computing device 100 depicted in FIG. 1 would include these features.

In one example, the software applications 126 stored in the memory 114 may include, but are not limited to, software applications operative to perform the various methods, features and functions described herein. Furthermore, the settings 130 may also be configured or stored in the memory 114 that allow the user to repetitively use these settings 130 for a user customized preference when interacting with a semantic query engine 124 in the controller 116. For example, a user may formulate his/her semantic query and customize contextual information to be saved in the memory 114. Accordingly, such information may be saved for repetitive uses when needed. It is noted that the settings 130 in the memory 114 may be in electrical communication with the semantic query engine 124 configured in the controller 116, or referred as a processor, so as to enable the operation of the settings 130 being performed in the semantic query engine 124 by the controller 116 when needed.

As depicted in FIG. 1, one or more sets of instructions 122 may be stored, completely or partially, within the controller 116, and executed by the computing device 100. Alternatively, one or more of the instructions may be stored in the applications 126 or other modules in the memory 114. In this regard, the memory 114 and the controller 116 can constitute machine-readable media. The term "machine-readable media", as used here, refers to a single non-transient medium or multiple non-transient media that store the one or more sets of instructions 122. The term "machine-readable media", as used here, also refers to any medium configured to store, encode or carry the set of instructions 122 for execution by the computing device 100 and that cause the computing device 100 to perform one or more of the methodologies of the present disclosure.

The semantic query engine 124 may be configured in the controller 116 that allows users to input semantic query in the computing device 100. The semantic query engine 124 may receive and process semantic queries from the user in a natural language form. The semantic query may be analyzed, processed or mapped by the modules set in the memory 114. For example, the semantic query may include a personal specific context, such as by referring to a place the user had been at a previous event, a place to which the user has plans to go, a place the user passes on a traveled route, a place that the user's friend said they went, etc. That context may be analyzed, compared and/or mapped by the modules set in the memory 114 to identify particular events or activities associated with the user that fits the semantic query input from the user. For example, a query such as "the Cuban restaurant I pass on my way to work" may be analyzed and compared to stored map/navigation information regarding the user's work location or the roads taken, and to identify any Cuban restaurants along that route. The semantic query engine 124 communicates with the software applications 126 and settings 130 in the memory 114, and/or from the database servers 112. In one example, the database servers 112 include at least a map application 204 and a user profile storage 202 saved in a memory 165 in the database servers 112, which will be described in greater detail with reference to FIG. 3. The memory 165 may be similar to the memory 114, configured to store data and information, such as the digital map with street view, two-dimensional view, three-dimensional view, or the like. At least one processor 167, similar to the controller 116, may be utilized in the database servers 112 configured to execute instructions from the memory 165.

Figure 2:
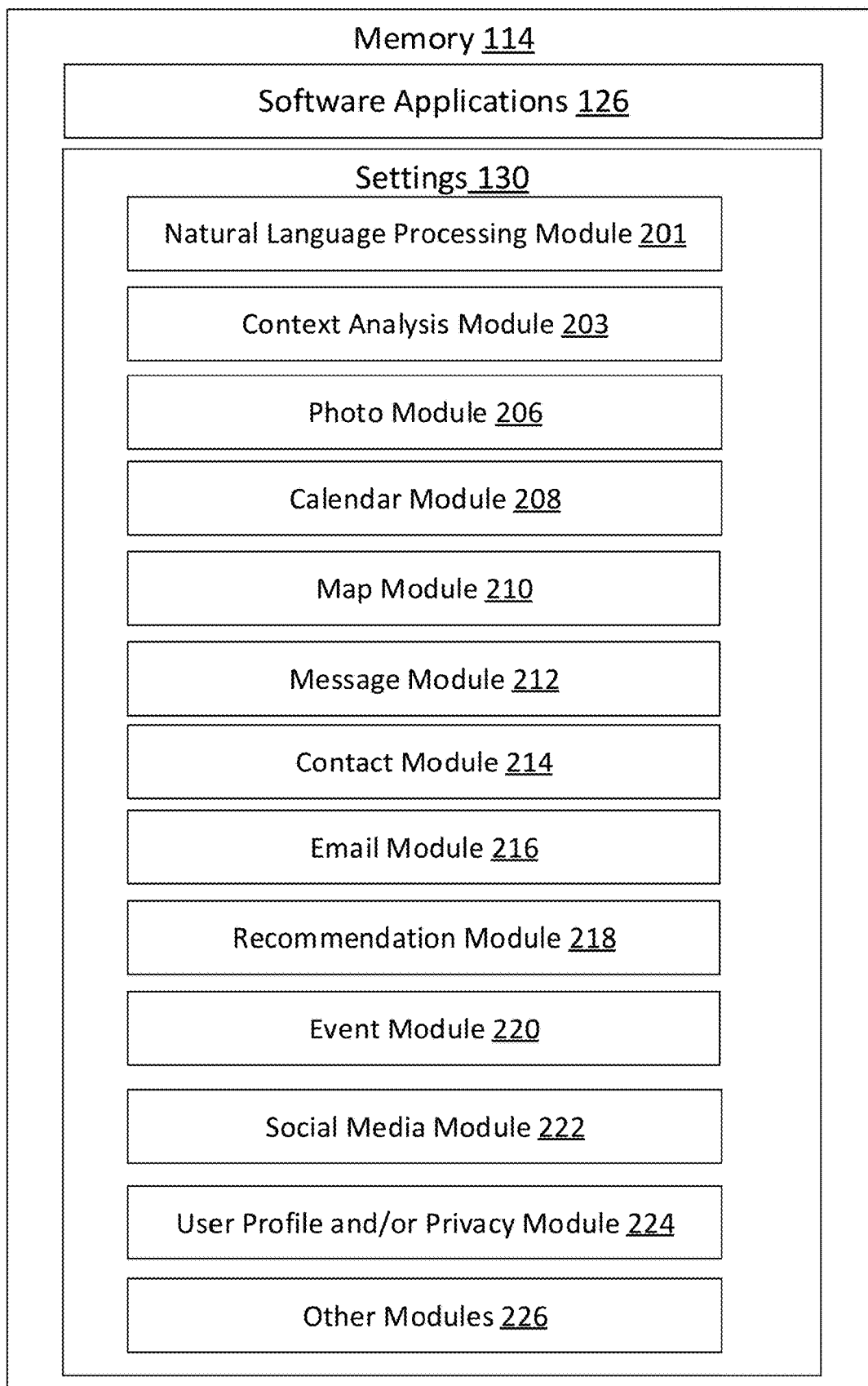
FIG. 2 is a block diagram of example memory of FIG. 1 according to aspects of the disclosure.

The map application 204 may include geographic information, such as the digital map with street view, two-dimensional view, three-dimensional view, or the like, that may be explorable and searchable by the user. The map application 204 may be periodically updated by a map provider or by the user. The user profile storage 202 may be similar to the user profile and/or privacy module 224 in the memory 114, as shown in FIG. 2. When authorized by the user, the user profile storage 202 may store information specific to the user, such as preferences, routines, or the like so as to provide customized information to the user. Any personally identifiable information is scrubbed or encrypted or otherwise protected to protect the user's identity and privacy. Accessing the data associated with the user will also require authorization from the user. In one example, the user may adjust a privacy setting to allow the computing device to access the personal information.

The processor 167, similar to the controller 116, may be utilized in the database servers 112 configured to execute command and instructions from the datacenter 214 and/or the memory 165. A client 219, such as a customer, a consumer, an end user and the like, may access and interact with the database server 112 through one or more of the computing devices 100

As illustrated in FIG. 1, components of the semantic query engine 124 may be executed on the computing device 100. In some implementations, one or more components of the semantic query engine 124 may be executed on the database server 112.

The controller 116 is also connected to the user interface 132. The user interface 132 includes input devices 134, output devices 136, and software routines or other user interface (not shown in FIG. 1) configured to allow a user to interact with and control the software applications 126 and the instruction 122 installed on the computing device 100. In one example, the software applications 126 may, for example, provide for the use of other positioning technologies in addition to or instead of GPS, such as, but not limited to other satellite-based positioning systems or other techniques such as IP geolocation, or the like. Such input and output devices 134, 136 may respectively include, but are not limited to, a display screen 150, a speaker 152, a keypad 142, a microphone 144, a touch screen 140, a haptic output 154 and so on. It is noted that the display screen 150 and the touch screen 140 as described herein may refer to the same object to provide multiple functionalities. For example, the display screen 150 may not only display content but also provides a touch-activated interface, referred to as a touch screen 140, that allows the user to input commands and to actively interact therewith. The input and output devices 134, 136 may include less, more, or different devices including a directional pad, a directional knob, accelerator, a Push-To-Talk ("PTT") button, sensors, a camera, a Radio Frequency Identification ("RFID")/Near Field Communication ("NFC") reader, sound/audio recognition devices, motion detector, accelerometers, activity monitors, and the like.

In one example, the user may input audio or textual semantic query through the input devices 134, such as the microphone 144 of the user interface 132. Audio input may be converted into textual information by the controller 116 for analysis. Identifiers from the semantic query may be selected and analyzed by the controller 116. The identifiers may be associated with information saved in the memory 114 in the computing device 100 or in the memory 165 in the database servers 112. Such information may include, for example, calendar events, messages, social media posts, navigation history, and the like. Such information may be used to identify one or more results responsive to the user's query. For example, a calendar entry titled "Tom's birthday party" may include the name and/or address of a pub, which may be returned in response to a semantic query of "the place where we went for Tom's birthday." In some examples, the information may be used to search for additional information. For example, a calendar entry that only included the name of the pub may be used to search the web for the address, operating hours, an image, reviews, etc. associated with the pub. It is noted that other user interface platforms, such as personal assistance applications, social media applications, or photo viewing applications or the like, may be utilized for semantic query input.

FIG. 2 depicts a block diagram of the memory 114 of FIG. 1 according to aspects of the disclosure. Several modules may be included in the settings 130 or software applications 126 in the memory 114. The modules included in the settings 130 of the memory 114 are executable components. In the example depicted in FIG. 2, the settings 130 include a natural language processing module 201, a context analysis module 203, a photo module 206, a calendar module 208, a map module 210, a message module 212, a contact module 214, an email module 216, a recommendation module 218, an event module 220, a social media module 222, a user profile and/or privacy module 224 and other modules 226. It should be understood that these are merely examples, and that the semantic query processing may be performed with fewer or different or additional modules. It is noted that the modules in the memory 114 may also be configured in the memory 165 in the database servers 112 so that the controller 116 of the computing device 100 may retrieve the information therefrom through the network 110.

In some examples, the natural language processing module 201, when executed by the controller 116 or processor in the computing device 100, causes the controller 116 to process the semantic query in natural language form. The natural language as input by the user is processed by the natural language processing module 201 and output to the context analysis module 203 for analysis. The context analysis module 203, when executed by the controller 116 or processor in the computing device 100, causes the controller 116 to process the text to identify, extract or analyze the contextual information. For example, the controller 116 or processor may search for parameters or semantic identifiers that refer to user specific activities, timeline, or the like. Parameters may include, for example, location, time value, persons, activity or event types and the like. Semantic identifiers may include specific key words that fit such parameters, such as proper names, dates, event titles, etc. For example, the semantic query input by the user, such as "where is the restaurant I ate at on my last birthday", may be analyzed to identify the parameters and semantic identifiers "I", "restaurant" and/or "last birthday" so as to conduct a search related to a past event associated with the user on or near a date saved in memory as the user's birthday.

The photo module 206, when executed by the controller 116 or the processor in the computing device 100, causes the controller 116 to process a photo album saved in the memory for photo information retrieval. The calendar module 208, when executed by the controller 116 or processor in the computing device 100, causes the controller 116 to search and select a timestamp when the associated search parameters fit the semantic query. The access or gathering of the data from the photo module 206 and/or calendar module 208 will require authorization from the user. For example, the user may adjust a privacy setting to allow the computing device to access the personal information.

The map module 210, when executed by the controller 116 or the processor in the computing device 100, causes the controller 116 to determine a location of the computing device 100 or the location where the past or future event associated with the semantic query occurred. The map module 210 may provide geographic information in a digital map and output the query results from the semantic query input by the user in the digital map. In some examples, the map module 210 may utilize a GPS feature, such as the GPS circuitry 118 of FIG. 1, to identify the locations or places associated with the events and/or the user. Such event information, including the events, timelines and/or places, may then be output in a presentation module, such as the display screen 150 in the computing device 100. It is noted that the event information may be output in a digital map, in a photo album from the photo module 206 and/or other service applications utilized in the computing device 100.

The contact module 214 causes the controller 116 to provide contact information saved by the user to be output in the computing device 100. The email module 216 causes the controller 116 to access the email database in the email module 216 associated with the user saved in the computing device 100. The access or gathering of the data from the contact module 214 will require authorization from the user. For example, the user may adjust a privacy setting to allow the computing device to access the personal information. The recommendation module 218 causes the controller 116 to provide relevance of a user's activity associated with the user's query and compute a recommendation score that may rank a closeness of correlation of each of the corresponding query results to the semantic query.

The event module 220 causes the controller 116 to provide information of the prior or future activities associated with the user saved in the computing device 100. The social media module 222 causes the controller 116 to access the applications or information from the social media database that may identify the user's social acquaintance, activities, locations, timestamps, or the like. The user profile and/or privacy module 224 causes the controller 116 to access a user specific profile that includes user's habits, preferences, or behaviors so as to provide customized information to the user based on the individual's needs. The access or gathering of the data associated with the users will require authorization from the user. For example, the user may adjust a privacy setting to allow the computing device to access the personal information.

Figure 3:
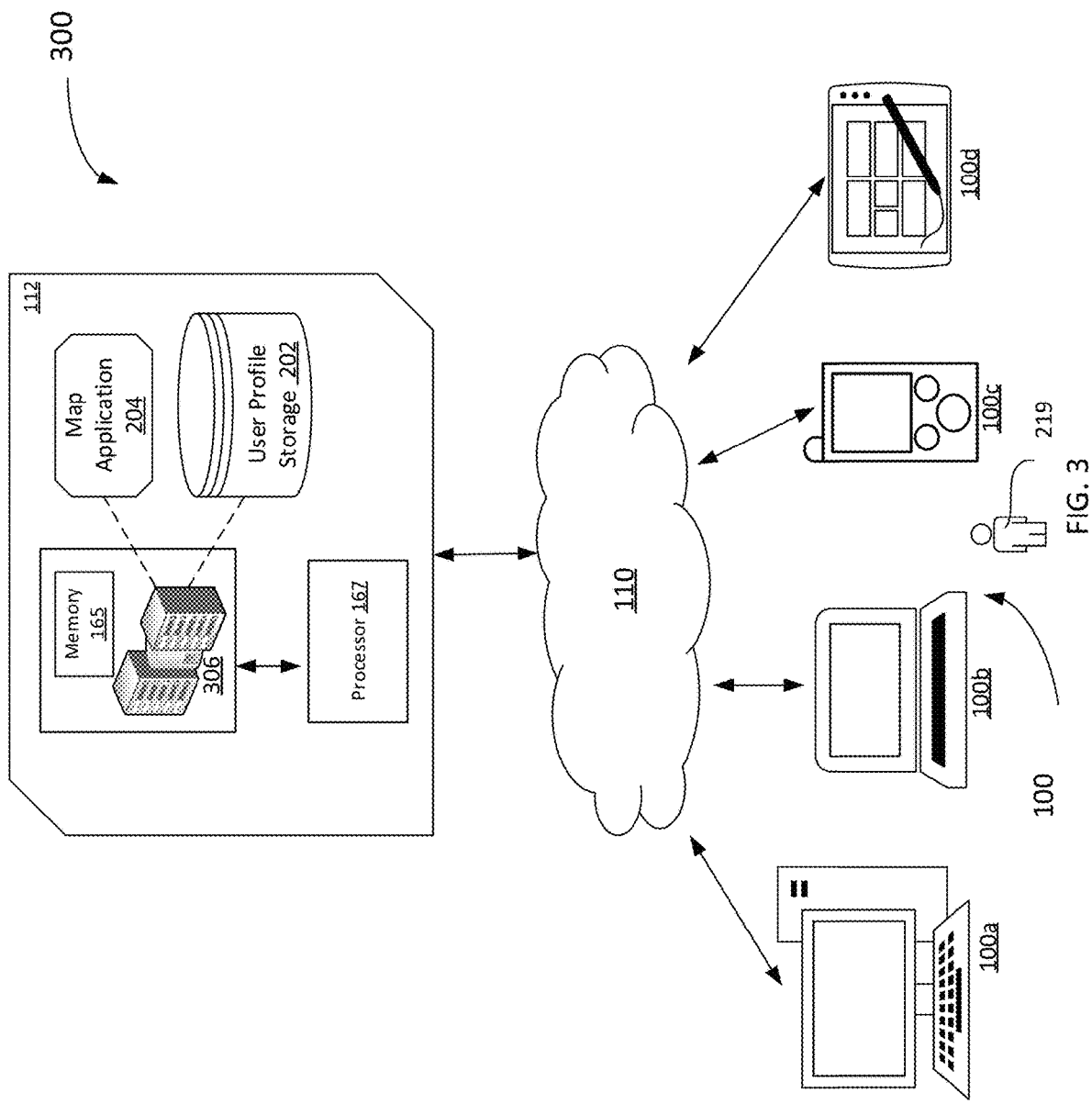
FIG. 3 is a block diagram of communications of a computing device through a network according to aspects of the disclosure.

FIG. 3 is a pictorial diagram illustrating example communications between the computing device 100 and the database server 122 via network 110. As discussed above, the database server 112 may include at least the map application 204 and also the user profile storage 202 saved in a memory 165 in the database servers 112. As shown in this example, any number of client computing devices 100a, 100b, 100c, 100d may access database server 112 in performing semantic queries. The client device may be a desktop computer 100a, a laptop 100b, a portable device 100c, a tablet 100d, or any other device capable of communication over a network and performing computational operations.

Figure 4A:
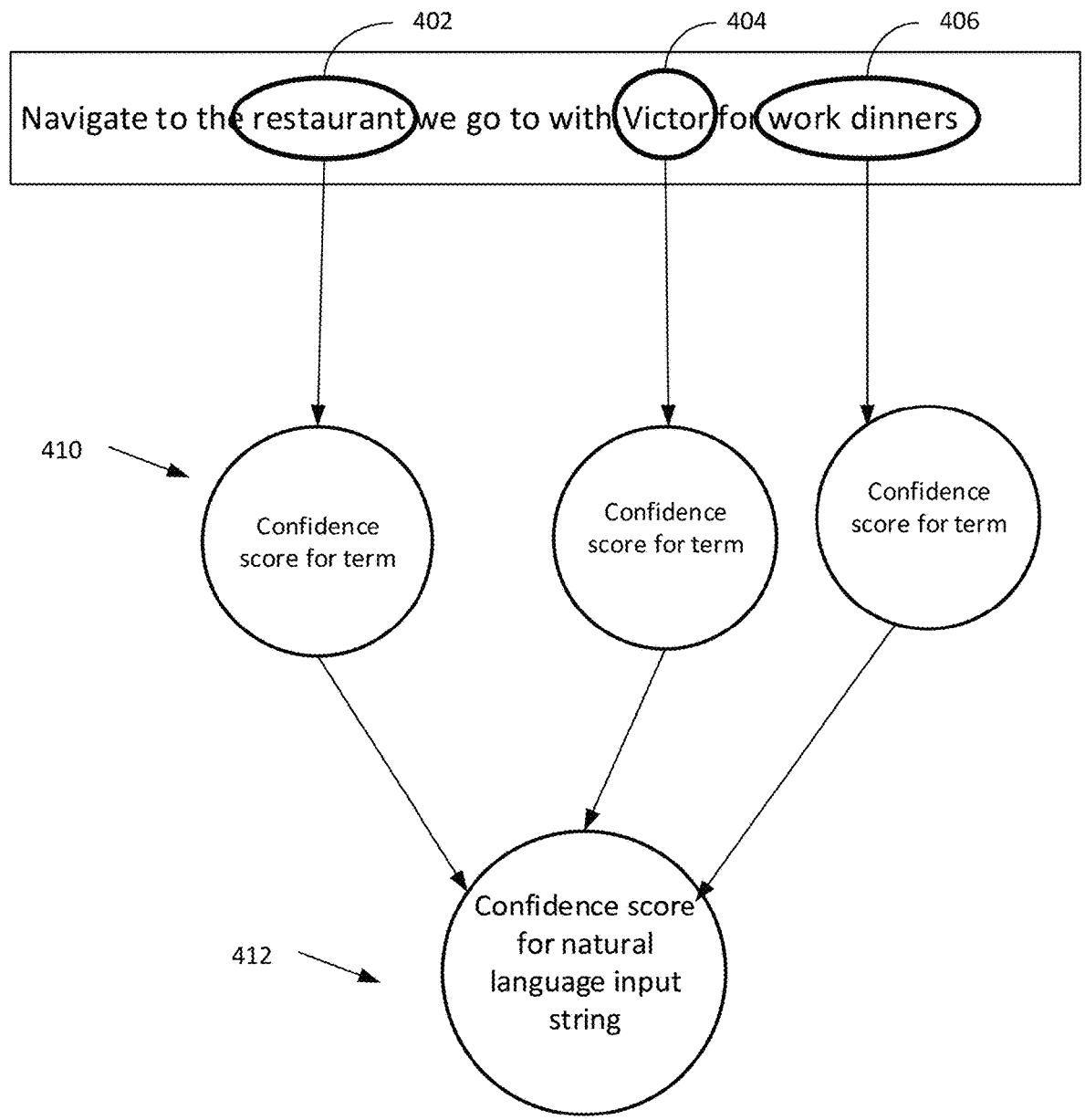
FIG. 4A illustrates an example confidence value for extraction from a natural language query according to aspects of the disclosure.

FIG. 4A illustrates an example of determining a confidence value for a natural language input. During operation, a user may input a semantic query in a natural language form in the computing device 100. Once received, the context analysis module 203 may analyze the input and identify key terms and phrases, such as by utilizing the settings from the natural language processing module 202. For example, when a semantic query "Navigate to the restaurant we go to with Victor for work dinners" is input, as depicted in FIG. 4A, the natural language processing module 202 and/or the context analysis module 203 may analyze the user specific information from the semantic query to further define the user intent. The natural language processing module 202 and/or the context analysis module 203 may be able to determine and understand the semantic identifiers, such as "restaurant", "Victor" and "work dinner", as shown in the circles 402, 404, 406 in FIG. 4A, by semantic interpretation.

In order to determine relevance of a piece of text to a place visited, a signal of a level of confidence may be determined. Text extraction confidence and a place correlation confidence may be used to determine the level of confidence. For example, a term extraction confidence 410 of certain terms and/or semantic identifiers, such as "restaurant", Victor" and/or "work dinner" are generated. The extraction confidence 410 indicates the confidence level that the correct information that has been derived from the text. According to some examples, the extraction confidence 410 may be used to determine an input string confidence 412 for the input string, such as by combining multiple term extraction confidence values.

In addition to the extraction confidence, a place correlation confidence may also be determined. The place correlation confidence may indicate how closely a piece of text corresponds to a particular place visited. For example, the term "work dinner" extracted from the text would give an indication that there is or was a work dinner, but specific location is not provided. Thus, based on the GPS information or other relevant information, one or more possible candidate visited places may be searched and found. These possible candidate visited places may be scored in terms of how well they match the type of place, such as the relevance of a work dinner to a visited location of a restaurant, a cafeteria, or a food stand.

It is noted that other computational approaches may be utilized to determine the extraction confidence, the place correlation confidence and other levels of confidence. For example, the confidence levels may be determined using one or more neural networks that compute embeddings. The one or more neural networks may then estimate how likely the query corresponds to the place through a distance function, such as cosine similarity, of the embeddings on the neural networks. This approach may be trained, configured or learned offline and utilized at runtime.

Figure 4B:
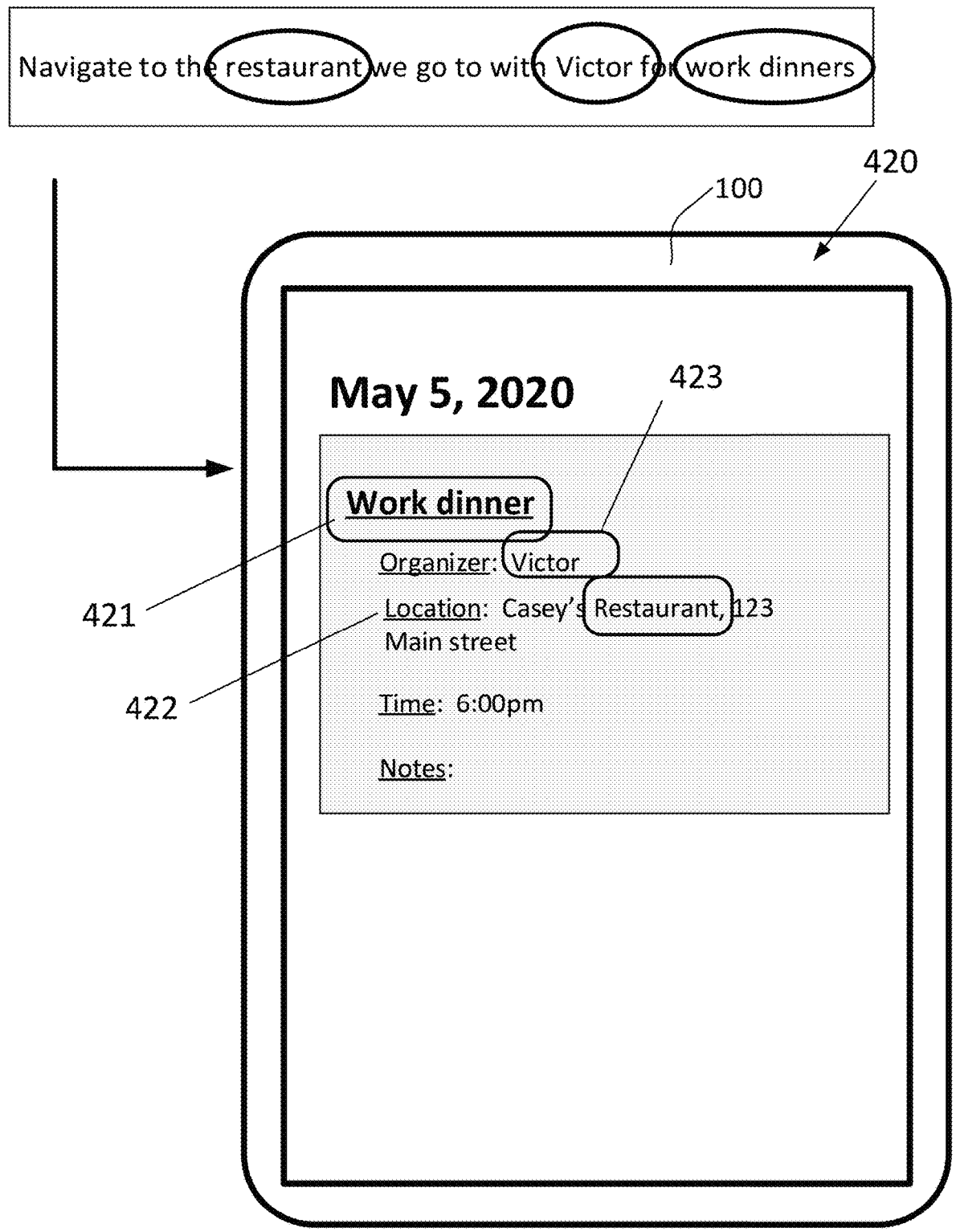
FIG. 4B illustrates an example of accessing calendar data to determine a query response according to aspects of the disclosure.

The extracted identifiers may be used to access data in the computing device and to identify information corresponding to the query. For example, in one example depicted in FIG. 4B, when accessing the data in the computing device, a calendar event 420 from the calendar module 208 may be identified based on the terms and/or semantic identifiers, such as "restaurant", "Victor" and/or "work dinner," from the semantic query. The calendar event 420 may include information of a work dinner 421 at a location 422 of a "restaurant" indicating where the "work dinner" occurred. In this example, another term and/or semantic identifier "Victor" 423 is also found in the calendar event 420, thus the level of place correlation confidence and/or event correlation confidence may be relatively high. Thus, a high recommendation score may be generated based on the high level of place correlation confidence.

It is noted that the information and the accessed data from the calendar event or other relevant event sources may be cached. For example, a minimal representation of the place may be extracted through a batch job that correlates the user specific information from different sources to the place. The correlation could be made readily available at runtime. By doing so, a query or look-up to the calendar event or other event sources may be eliminated.

Figure 4C:
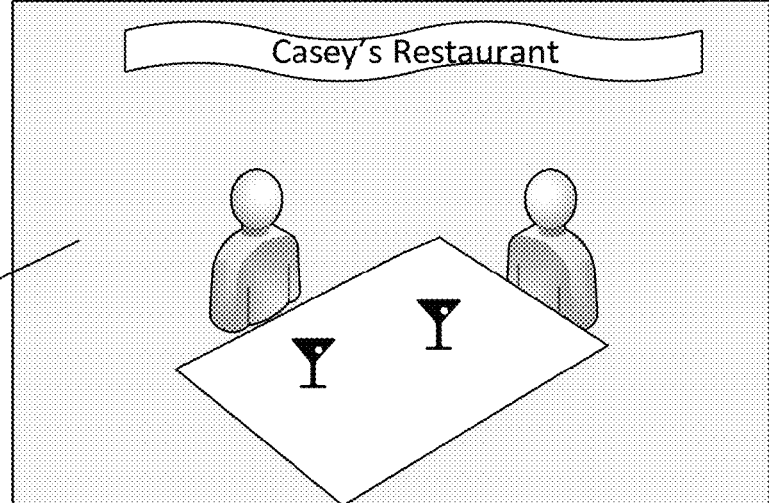
FIG. 4C illustrates an example of accessing photo data to determine a query response according to aspects of the disclosure.

As another example, illustrated in FIG. 4C, a photo 424 from a photo module 206 may be identified based on the extracted terms. The photo 424 may have a high level of correlation with the semantic query. An image recognition technique may be utilized to identify and extract information of the scene, venues, or people from the image of the photo 424. For example, the image recognition technique may extract and recognize from the image in the photo 424 including a friend "Victor" having a meal with the user. Image recognition may also identify attributes in the background which may indicate that the photo was taken at a particular location, such as a sign indicating "Casey's Restaurant." Image recognition models may be trained to detect certain features, such as text, objects, places, etc. Such detection is often performed by machine learning and may include deep neural networks, such as convolutional neural networks (CNN) and/or recurrent neural networks (RNN). Alternatively or additionally, metadata for the photo 424 may be compared with the extracted search terms. For example, timestamps, image tags, image capture location, or other types of metadata may be stored in association with the photo 424. Such metadata may be analyzed to determine a result responsive to the input query. For example, the extracted term "Victor" may be identified in the metadata, and the timestamp may correspond to a time people commonly eat dinner. Thus, the photo 424 may be identified as being taken at the location the user is referring to in the semantic query. Therefore, other information in the metadata, such as the image capture location, may be used to generate a search result.

According to some examples, the query results with the recommendation scores may be output to allow the user to select, accept or deny recommended results.

In some examples, an order in which the data is accessed by the computing device 100 may be configured such that some types of data have a higher priority, that data is accessed in a predetermined order, etc. For example, access of data from the calendar module 208 may weigh higher than access of data from the message module 212. In some examples, the order and/or priority of the data access may be configured or set based on the type of request, the preference or personal habits of the user, or other factors. For example, configuring the order of data access based on user specific activities or routines may improve the accuracy of the query results to best fit the user's intent. For example, when a user prefers using text messages more often than a calendar to set his/her personal affairs, data access from the message module 212 may be set to weigh higher than the data from the calendar module 208.

After the query results are obtained and populated in the computing device, the user may select an intended and/or target query result that best fits his/her search intent. Such selected query result may then be saved in the user profile and privacy module 224, as shown in FIG. 2, or the user profile storage 202 of the database server 112, as shown in FIG. 1. When sufficient information regarding the user's selection and preference is detected or saved, a user pattern, user habit, or user routine may be established and built in the computing device, or by a machine learning algorithm, so as to provide customized and specific information that is particularly useful to the user as needed. For example, a user may prefer to purchase his/her morning coffee at a coffee shop on a road with less traffic to his/her workplace, rather than at a coffee shop on a busy street. Thus, such user habit or pattern may be set and saved in the computing device to facilitate user's utilization of the computing device. In one example, when the user inputs "navigate to the morning coffee shop I go to on the way to work," a query result may be populated based on the user's preference or pattern setting to meet the user's intended search. The information and/or query results as saved may be associated with user's preference or habits, including "favorite" restaurants, events, "anniversary" routines, "commute" preference, "work" activities, "family" "birthdays", and the like, utilizing proper semantic identifiers as an index for machine learning and user specific database establishment.

Figure 5A:
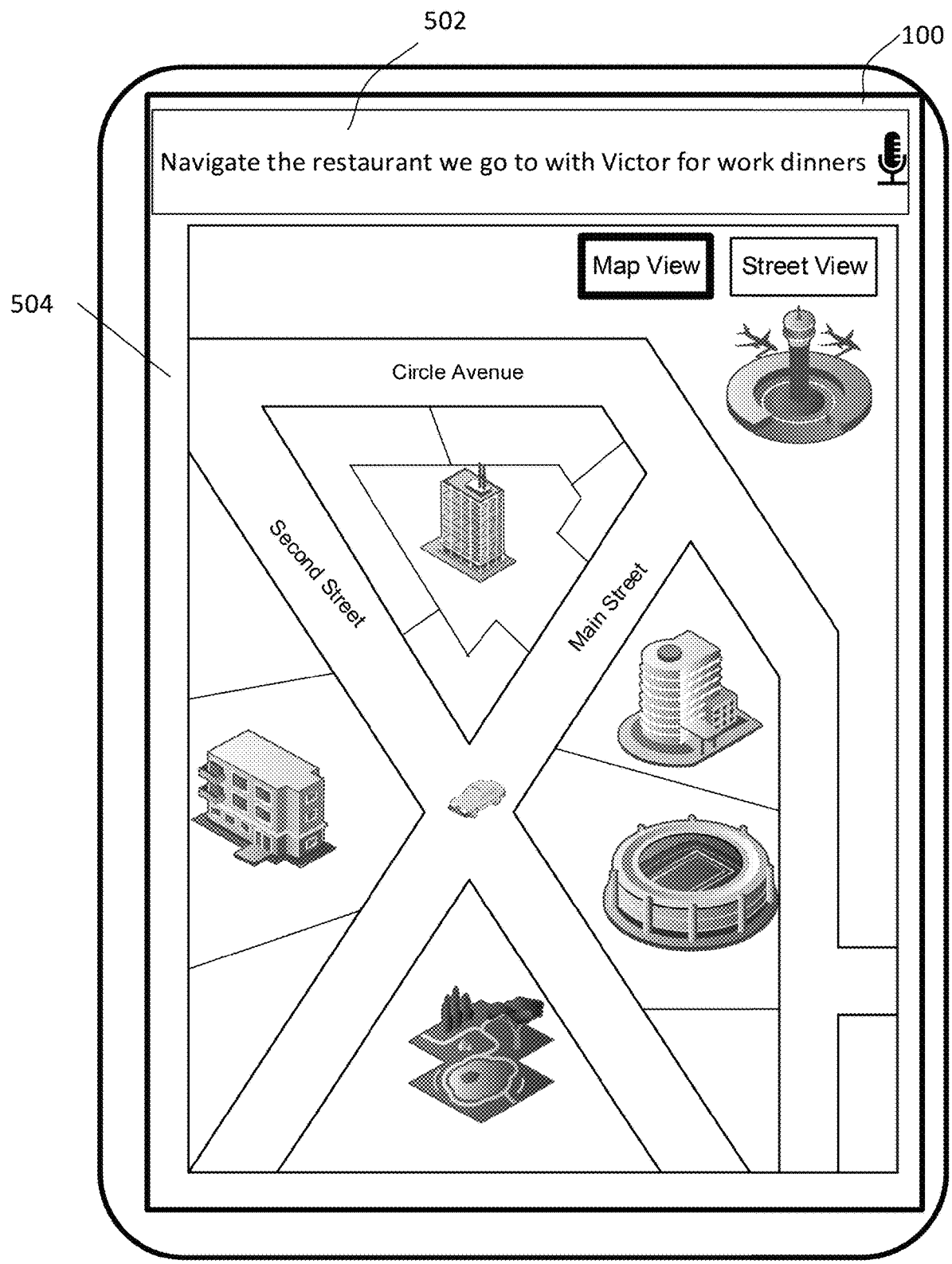
FIG. 5A is an example screenshot illustrating semantic query input according to aspects of the disclosure.

FIG. 5A-5D depict an example of a semantic query input in a map application configured in the computing device 100. In the example depicted in FIG. 5A, a semantic query "Navigate to the restaurant we go to with Victor for work dinners" is input in a search box 502 in a digital map 504 in the computing device 100. The semantic query may be input in a natural language form using text, audio, or the like. The digital map 504 of FIG. 5A is depicted in map view with the structures, buildings, infrastructures shown in a top two-dimensional view.

Figure 5B:
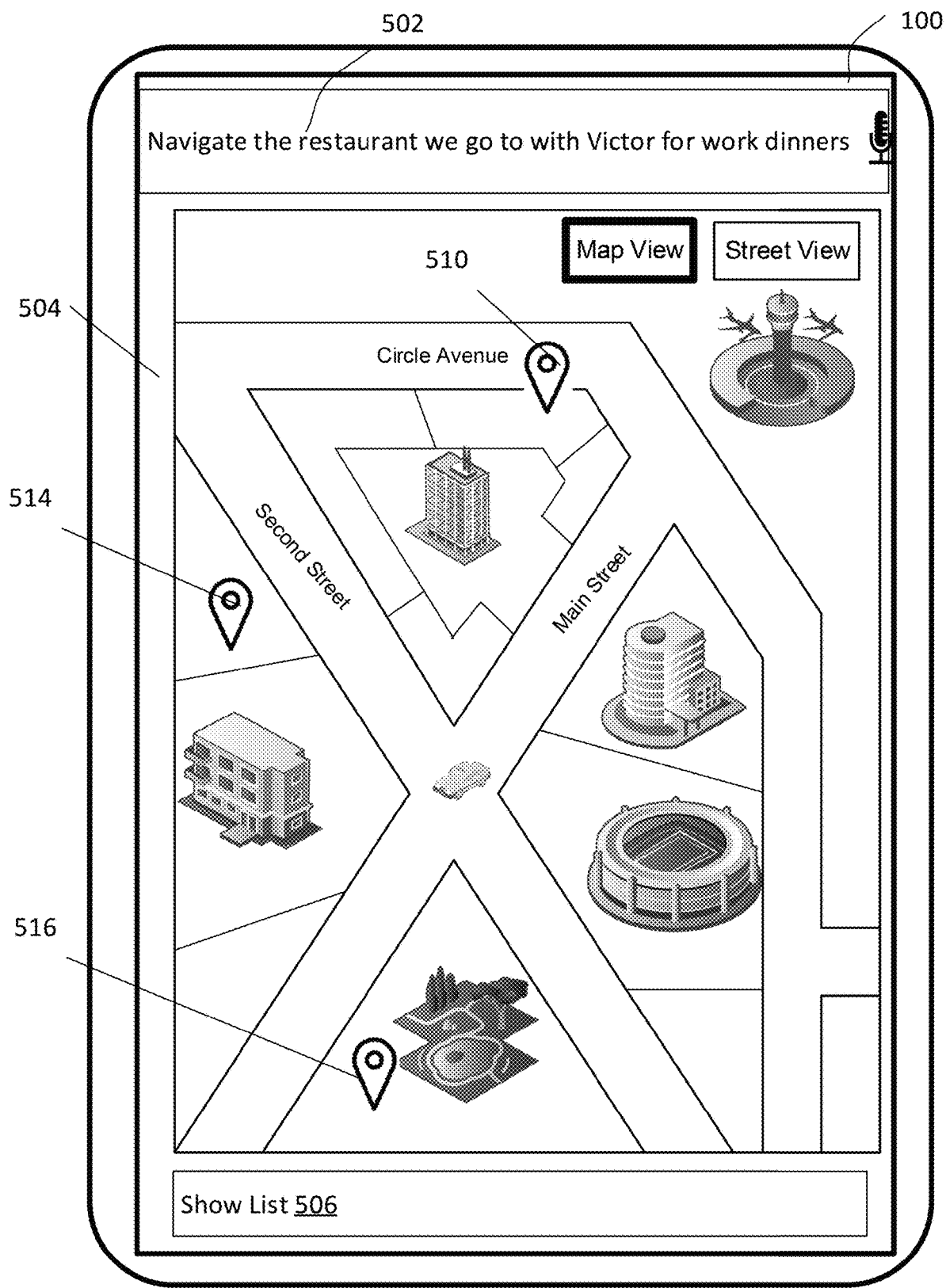
FIG. 5B is an example screenshot illustrating query results according to aspects of the disclosure.

After the semantic query is input in the digital map 504 in the computing device 100, a computational algorithm is performed in response to the semantic query. One or more query results 510, 514, 516 may then be populated in the digital map 504 with a corresponding event location displayed in the digital map, as shown in FIG. 5B, for user's exploration and review. A show list icon 506 may also be generated in the digital map 504. When the user interacts with the icon 506, the query results 510, 514, 516 may be listed as a break-down list 522 in a textual form, as further depicted in FIG. 5C. The user may select one of the query results 510, 514, 516 that best fits his/her searching intent so that the computing device 100 may provide navigation in the digital map 504 to the user for travel to the intended destination.

Figure 5C:
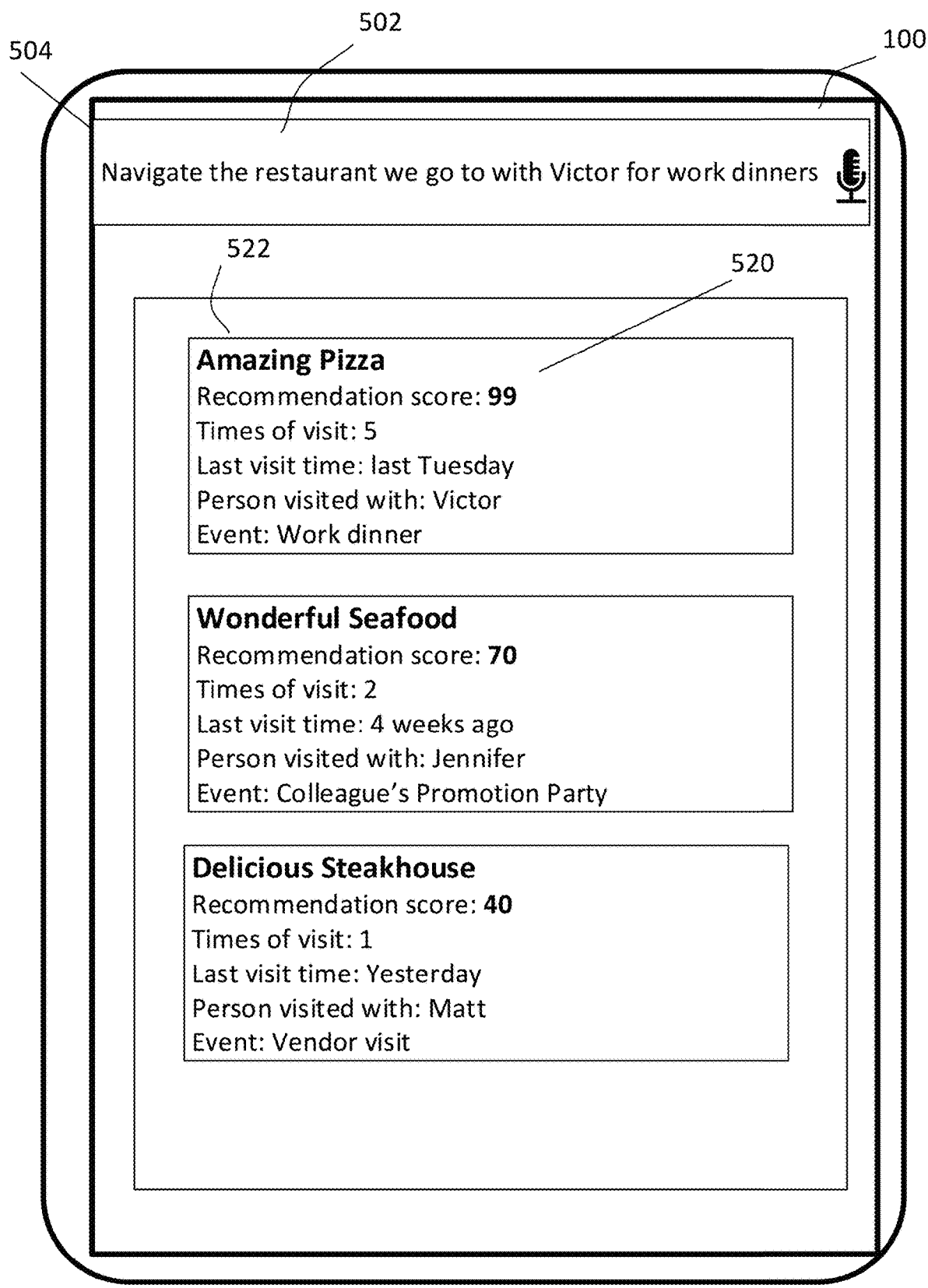
FIG. 5C is a list of the query results of FIG. 5B with recommendation scores according to aspects of the disclosure.

According to some examples, the break-down list 522, as depicted in FIG. 5C, further itemizes each of the query results 510, 514, 516 with recommendation scores or other related information so as to assist the user selecting an intended query result. For example, the first textual query result 520, which may include detailed textual information corresponding to the map query result 510 depicted in FIG. 5B, further depicts the recommendation score and other associated information so as to assist the user determining an accurate query result that fits his/her intended search. In the example depicted in FIG. 5C, the first textual query result 520 provides a relatively high recommendation score of 99 with other information associated with the semantic query. For example, the person visited with is listed as "Victor" which matches the semantic query input by the user. The event is also categorized as "work dinner" which also matches the semantic query. Other associated information, such as times of visits, timestamps, and the like, may also be provided so as to help the user determine the search result that fits his/her search intent.

In some examples, the one or more query results may be populated along with an event photo, event video, or other relevant information. For example, the query result 520 may be displayed alongside a picture of the user and Victor at the place.

Figure 5D:
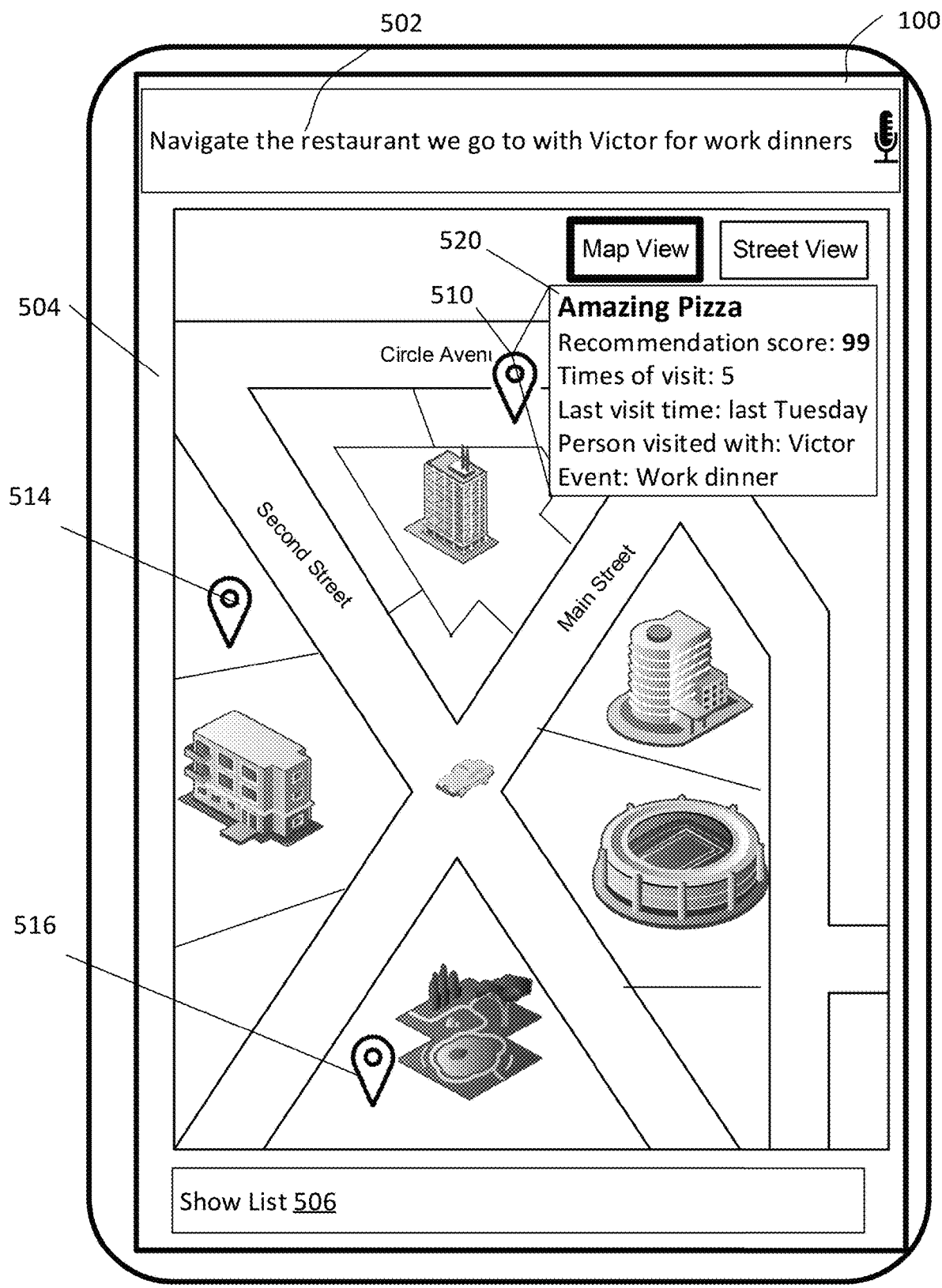
FIG. 5D is an example screenshot illustrating query results of FIG. 5B with recommendation scores according to aspects of the disclosure.

According to further examples, the first textual query result 520 may be shown in the digital map 504 by interacting with the query result 510, as depicted in FIG. 5D, without population of the break-down list 522. All query results 510, 514, 516 shown in the digital map 504 are selectable to further populate the recommendation scores or other associated information.

By computationally analyzing multiple correlations and factors, an overall high confidence level of the search results may be generated to provide a relatively accurate query result list that fits the user's intended search. Furthermore, the recommendation score is also generated based on the evaluation of the overall confidence level including correlations of the multiple factors, such as location, event and timestamps. As such, a recommendation score with a relatively high confidence level may be obtained. Thus, a delightful user experience may be obtained based on the accurate query results utilized and depicted in the digital map 504 of the computing device 100.

Figure 6:
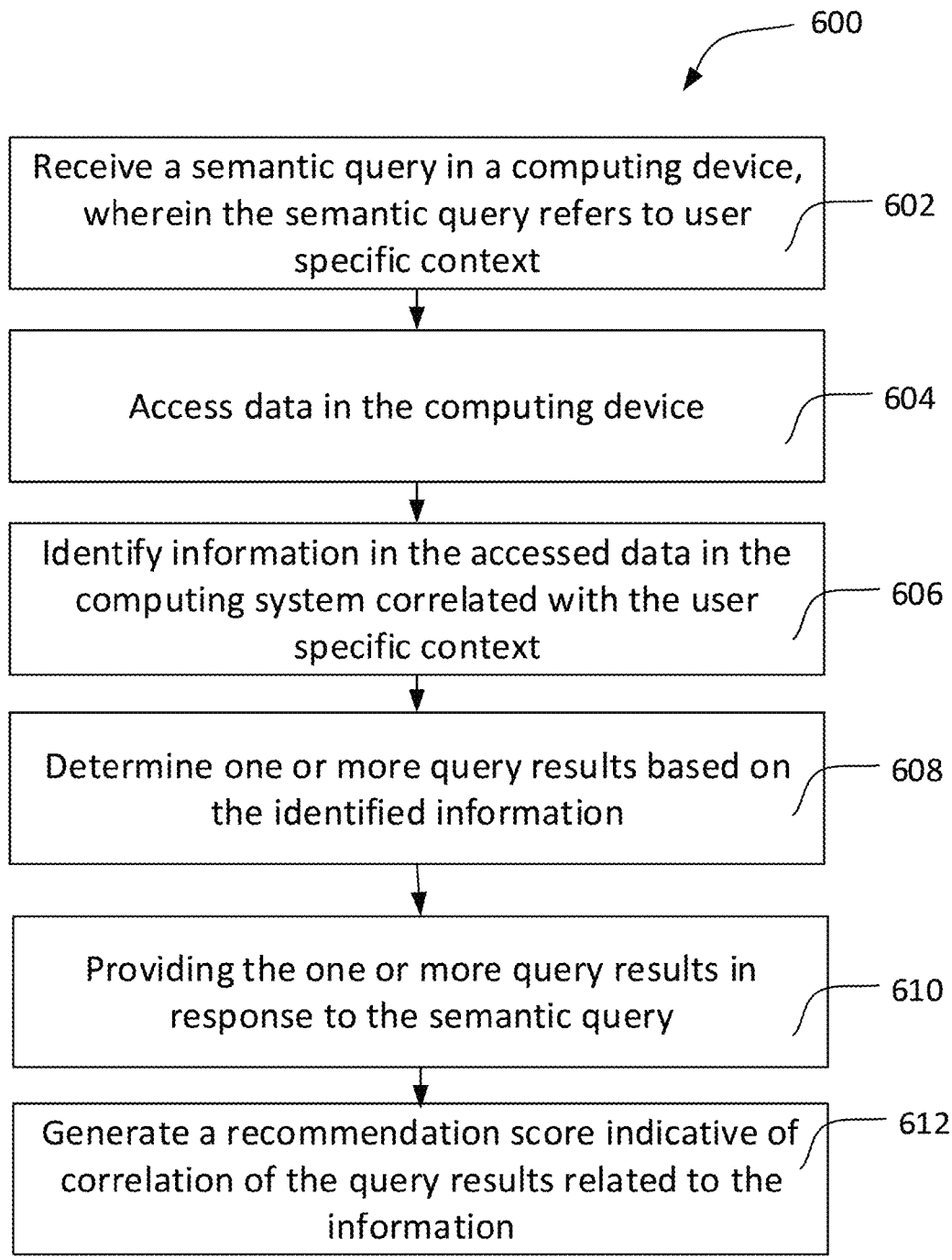
FIG. 6 is a flow diagram illustrating an example method according to aspects of the disclosure.

FIG. 6 depicts a flow diagram illustrating an example method 600 of performing a semantic query. Such method may be performed by operations utilizing a computing device 100, such as the computing device 100a, 100b, 100c, 100d described above, modifications thereof, or any of a variety of other computing devices having different configurations. Access or gathering of data associated with the users in response to the semantic query will require authorization from the user. For example, the user may adjust a privacy setting to allow the computing device to access the personal information.

It should be understood that the operations involved in the following methods need not be performed in the precise order described. Rather, various operations may be handled in a different order or simultaneously, and operations may be added or omitted.

In block 602, a semantic query may be received by the computing device 100. The semantic query may be input by a user of the computing device 100. In one example, the semantic query may refer to user specific context associated with the user regarding certain historical or future events. In one example, the semantic query is input to a digital map of a map application launched in the computing device 100.

In block 604, based on the semantic query, data related to the user is accessed to perform a search in response to the semantic query. For example, calendar entries, photos, videos, messages, and other content and associated metadata may be accessed. The associated metadata may include timestamps, location information, image recognition information, etc.

In block 606, information in the accessed data that correlates with the user specific context is identified. The information may include, for example, location information, time, proper names of people or places, etc.

In block 608, based on the identified information, one or more query results may be determined by the computing device. For example, all places potentially matching the semantic query may be determined using the identified information. Moreover, the places may be ranked based on how closely they match the query.

In block 610, the query results are provided in response to the query. For example, the query results may be populated in a digital map.

In block 612, based on the query results, a recommendation score indicative of the correlation of each query result related to the identified information may be provided in the computing device. Accordingly, the user may select a query result that best matches his/her query intent. In some examples, the user may initiate further actions based on a selected query result. For example, the user may interact with a particular query result to initiate navigation to the place, to call the place, to visit the website of the place, etc.

The present disclosure provides a computing device for providing search results to users based on semantic queries from the users. The semantic queries may be input in a natural language form and interpreted by the computing device. The semantic queries may include user specific context. In this regard, the user may utilize the computing device to recall certain personal specific information previously processed in the computing device and output such information in the computing device with a recommendation score indicative of a confidence level of correlation of the query results.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
receiving, by one or more processors, a semantic query input by a user in a computing device;
identifying, by the one or more processors, semantic identifiers in the semantic query, wherein the semantic identifiers refer to user specific context associated with prior or planned activities of the user, the semantic identifiers including keywords identifying at least one of place, location, time, value, person, activity, or event types in the user specific context;
determining, by the one or more processors, a priority order of data types, wherein each data type is weighted based on user preferences and user habits, and wherein each data type corresponds to a user data source;
accessing in the determined priority order of data types, by the one or more processors, user data stored in the two or more user data sources on the computing device;
identifying, by the one or more processors based on the semantic identifiers, information in the accessed user data correlated with the user specific context;
determining, by the one or more processors, a level of confidence for one or more query results, wherein the level of confidence indicates a correlation between the semantic identifiers and the identified information; and
providing, by the one or more processors, the one or more query results in response to the semantic query based on the level of confidence.

2. The method of claim 1, further comprising:
generating, by the one or more processors, a recommendation score based on the level of confidence.

3. The method of claim 2, further comprising providing the recommendation score along with the one or more query results.

4. The method of claim 1, wherein identifying the information correlated with the user specific context comprises identifying at least one of sent or received text messages, incoming/outgoing phone calls, emails, photos, videos, calendar events, social media, contact information, names of associated friends, local traffic patterns, places or visited restaurants, or recorded or marked locations in a digital map.

5. The method of claim 1, further comprising:
outputting the one or more query results in a digital map utilized in the computing device, wherein the one or more query results are associated with event locations displayed in the digital map.

6. The method of claim 1, further comprising:
outputting the one or more query results with an associated event photo.

7. The method of claim 1, wherein the semantic query is received in a natural language form.

8. The method of claim 1, further comprising:
receiving, by the one or more processors, an input for selection of one of the one or more query results.

9. The method of claim 1, wherein determining one or more query results comprises processing the identified information using neural networks.

10. The method of claim 9, wherein processing the identified information comprises generating at least one of place embeddings or correlated data and query embedding by running a neural network.

11. The method of claim 1, further comprising:
detecting, by the one or more processors, a user pattern based on the accessed data; and
saving, by the one or more processors, the user pattern in the computing device.

12. The method of claim 1, wherein identifying the information in the accessed data further comprises:
correlating visited places with the semantic identifiers from the user specific context.

13. The method of claim 12, further comprising:
correlating event information with the visited places and the semantic identifiers from the user specific context.

14. The method of claim 13, further comprising:
correlating timestamps with the event and visited places and the semantic identifiers from the user specific context.

15. The method of claim 1, further comprising:
receiving, by the one or more processors, an input for selection of one of the query results; and
providing, by the one or more processors, navigation in the computing device for travel to a destination based on the selected query result.

16. A computing device, comprising:
one or more memories:
one or more processors in communication with the one or more memories, the one or more processors configured to:
receive a semantic query input by a user;
identify semantic identifiers in the semantic query, wherein the semantic identifiers refer to user specific context associated with prior or planned activities of the user, the semantic identifiers including keywords identifying at least one of place, location, time, value, person, activity, or event types in the user specific context;
determine a priority order of data types, wherein each data type is weighted based on user preferences and user habits, and wherein each data type corresponds to a user data source;
access, in the determined priority order of data types, user data stored in the two or more data sources on the computing device;
identify, based on the semantic identifiers, information in the accessed user data correlated with the user specific context;
determine a level of confidence for one or more query results, wherein the level of confidence indicates a correlation between the semantic identifiers and the identified information; and
provide the one or more query results in response to the semantic query based on the level of confidence.

17. The computing device of claim 16, wherein the one or more processors are further configured to:
generate a recommendation score based on the level of confidence.

18. The computing device of claim 16, wherein the one or more processors are further configured to:
receive an input in the computing device to select one of the query results; and
generate navigation information in a digital map in the computing device.

19. A non-transitory computer-readable storage medium storing instructions executable by one or more processors for performing a method, comprising:
receiving, by one or more processors, a semantic query input by a user in a computing device;
identifying, by the one or more processors, semantic identifiers in the semantic query, wherein the semantic identifiers refer to user specific context associated with prior or planned activities of the user, the semantic identifiers including keywords identifying at least one of place, location, time, value, person, activity, or event types in the user specific context;
determining, by the one or more processors, a priority order of data types, wherein each data type is weighted based on user preferences and user habits, and wherein each data type corresponds to a user data source;
accessing, in the determined priority order of data types, by the one or more processors with authorization from the user, user data stored in the two or more user data sources on the computing device;
identifying, by the one or more processors based on the semantic identifiers, information in the accessed user data correlated with the user specific context;
correlating, by the one or more processors, visited places with the semantic identifiers from the user specific context;
determining, by the one or more processors, on a level of confidence for one or more query results, wherein the level of confidence indicates a correlation between the semantic identifiers and the identified information; and
providing, by the one or more processors, the one or more query results in response to the semantic query based on the level of confidence.

20. The computer-readable storage medium of claim 19, further comprising:
generating a recommendation score based on the level of confidence.

* * * * *